(12) United States Patent
Bao et al.

(10) Patent No.: US 10,942,414 B2
(45) Date of Patent: Mar. 9, 2021

(54) ELECTRONIC INK DISPLAY SCREEN AND MANUFACTURING METHOD THEREOF

(71) Applicant: WUXI VISION PEAK TECHNOLOGY CO., LTD, Wuxi (CN)

(72) Inventors: Jin Bao, Wuxi (CN); Lei Zhang, Wuxi (CN); Shan Chen, Wuxi (CN)

(73) Assignee: WUXI VISION PEAK TECHNOLOGY CO., LTD, Wuxi (CN)

( * ) Notice: Subject to any disclaimer, the term of this patent is extended or adjusted under 35 U.S.C. 154(b) by 233 days.

(21) Appl. No.: 16/334,755

(22) PCT Filed: Aug. 29, 2017

(86) PCT No.: PCT/CN2017/099475
§ 371 (c)(1),
(2) Date: Mar. 20, 2019

(87) PCT Pub. No.: WO2019/037139
PCT Pub. Date: Feb. 28, 2019

(65) Prior Publication Data
US 2019/0391457 A1  Dec. 26, 2019

(30) Foreign Application Priority Data
Aug. 21, 2017 (CN) .......................... 201710716173.7

(51) Int. Cl.
*G02F 1/1679* (2019.01)
*G02F 1/16757* (2019.01)
(Continued)

(52) U.S. Cl.
CPC ........ *G02F 1/1679* (2019.01); *G02F 1/13439* (2013.01); *G02F 1/167* (2013.01);
(Continued)

(58) Field of Classification Search
CPC ............... G02F 1/1679; G02F 1/16757; G02F 1/16766; G02F 1/13439; G02F 1/167;
(Continued)

(56) References Cited

U.S. PATENT DOCUMENTS

| 3,892,568 A | 7/1975 | Ota |
| 5,739,880 A * | 4/1998 | Suzuki ............. G02F 1/133512 349/110 |

(Continued)

FOREIGN PATENT DOCUMENTS

| CN | 101101394 A | 1/2008 |
| CN | 101697050 A | 4/2010 |

(Continued)

*Primary Examiner* — Tuyen Tra
(74) *Attorney, Agent, or Firm* — Bayramoglu Law Offices LLC

(57) ABSTRACT

An electronic ink display screen, wherein a spacer frame is coated on the pixel electrode by a One Drop Filling (ODF) process, the spacer frame includes a first spacer frame and a second spacer frame. The second spacer frame is located on a side of the first spacer frame. The electronic ink microcapsule array is provided inside the first spacer frame. Conductive silver paste is provided inside the second spacer frame. The upper transparent electrode is covered on the spacer frame. The conductive silver paste electrically contacts the pixel electrode and the upper transparent electrode, respectively. Peripheries of the spacer frame and the upper transparent electrode are sealed and fixed by a waterproof adhesive. The electronic ink display screen of the present invention uses the ODF production process, so there is no complicated process in the production of the traditional electronic paper film sheet.

10 Claims, 5 Drawing Sheets

(51) Int. Cl.
*G02F 1/16766* (2019.01)
*G02F 1/1343* (2006.01)
*G02F 1/167* (2019.01)

(52) U.S. Cl.
CPC ...... *G02F 1/16757* (2019.01); *G02F 1/16766* (2019.01); *G02F 2201/123* (2013.01)

(58) Field of Classification Search
CPC ............. G02F 2201/123; G02F 1/1676; G02F 2001/13415; G02F 1/1339; G02F 1/133305; G02F 1/1685
See application file for complete search history.

(56) References Cited

U.S. PATENT DOCUMENTS

| | | | |
|---|---|---|---|
| 5,930,026 A | 7/1999 | Jacobson et al. | |
| 5,961,804 A | 10/1999 | Jacobson et al. | |
| 6,017,584 A | 1/2000 | Albert et al. | |
| 6,120,588 A | 9/2000 | Jacobson | |
| 6,930,818 B1 | 8/2005 | Liang et al. | |
| 8,289,493 B2 * | 10/2012 | Shiau | G02F 1/1337 349/153 |
| 2006/0103916 A1 | 5/2006 | Kawai | |
| 2006/0291034 A1 | 12/2006 | Patry et al. | |
| 2007/0121194 A1 | 5/2007 | Kanbe | |
| 2007/0146309 A1 | 6/2007 | Uchida | |
| 2009/0225064 A1 * | 9/2009 | Sah | G02F 1/167 345/206 |
| 2010/0144229 A1 | 6/2010 | Lee | |
| 2020/0110295 A1 * | 4/2020 | Huang | G02F 1/1339 |

FOREIGN PATENT DOCUMENTS

| | | |
|---|---|---|
| CN | 102033381 A | 4/2011 |
| CN | 105223754 A | 1/2016 |
| KR | 20070088997 A | 8/2007 |

* cited by examiner

ELECTRONIC INK DISPLAY SCREEN AND MANUFACTURING METHOD THEREOF

CROSS REFERENCE TO THE RELATED APPLICATIONS

This application is the national phase entry of International Application No. PCT/CN2017/099475, filed on Aug. 29, 2017, which is based upon and claims priority to Chinese Patent Application No. 201710716173.7, filed on Aug. 21, 2017, the entire contents of which are incorporated herein by reference.

TECHNICAL FIELD

The present invention relates to a display screen and a manufacturing method thereof, in particular to an electronic ink display screen and a manufacturing method thereof, which pertains to the technical field of electronic display.

BACKGROUND

The electrophoretic display technology was first proposed in the 1970s. Over the past decade, the electrophoretic display technology has made its progress, and achieved great improvements in the performance and manufacturing method. The American patent U.S. Pat. No. 3,892,568 discloses a process of preparing an electrophoretic display material containing at least one type of electrophoretic particles. The Japanese patent JP1086116 discloses an electrophoretic display system containing at least one type of electrophoretic particles and the electrophoretic liquid is encapsulated with microcapsules. The American patents U.S. Pat. Nos. 5,930,026, 5,961,804, 6,017,584, and 6,120,588 disclose a microencapsulated electrophoretic display unit, wherein the electrophoretic display liquid includes two or more types of electrophoretic particles having different photoelectric performances. The American patent U.S. Pat. No. 6,930,818 discloses an electrophoretic display unit encapsulated with a micro cup.

FIG. 1 and FIG. 2 show structural schematic diagrams of electronic ink display screens in the prior art, which includes an electronic paper film sheet (20), a Protective Sheet (PS) (22) covered on the electronic paper film sheet (20), and a glass substrate (21) located under the electronic paper film sheet (20), wherein the electronic paper film sheet (20) is obtained by repeatedly coating and trimming and consists of an Indium Tin Oxide (ITO) transparent electrode, an electronic ink capsule layer, a hot melt adhesive layer, and an Optically Clear Adhesive (OCA) layer. The PS (22) consists of a Polyethylene Terephthalate (PET) layer and a waterproof layer. In the process of manufacturing the electronic ink, a certain amount of conductive silver paste (8) is firstly dropped at the position of a silver paste hole on the trimmed electronic paper film sheet (20). The glass substrate (21) is bonded to the electronic paper film sheet (20) by the hot pressing and the hot-melt adhesive layer. The trimmed PS (22) is attached to the electronic paper film sheet (20) by pressing through a machine. The integrated circuit (IC) module (10) is directly bound to the glass substrate (21) by the Chip On Glass (COG) process, then a waterproof adhesive (4) is coated around the screen by an adhesive dispenser for the edge sealing, and finally the silica gel (19) is coated around the IC module (10) to protect the IC module (10).

At present, the electrophoretic display technology has many disadvantages in performance and in manufacturing method:

1. The preparation process of the microcapsule electronic paper film sheet is complicated.

a) The coating of the micro cup electronic paper film sheet requires the equipment to have high precision, and the coating of the micro cup electronic paper film sheet has a high use cost, many coating defects, an uneven distribution of microcapsules, and an uneven coating thickness.

b) The encapsulation technology of the electronic paper film sheet (20) is difficult, and has an unstable manufacturing process, a low production efficiency, and problems such as leakage, low contrast, and narrow temperature range for use etc.

c) The trimming loss rate of the electronic paper film sheet (20) is usually up to 40%, which leads to a utilization yield of the electronic ink less than 40%.

2. The electronic ink display screen has problems such as complicated manufacturing processes, low degree of automation in production, low production efficiency, low yield, high material loss, and high production cost.

In recent years, with the growing size of liquid crystal display, the One Drop Filling (ODF) process gets more and more attention. Compared with the traditional liquid crystal manufacturing process, the ODF process has the following characteristics. 1. The injection time of liquid crystal is greatly shortened without being limited by factors like size and thickness etc., thereby reducing the manufacturing time. The work that needs to be completed by traditional process in three days can be completed by the ODF process in less than one day. 2. The processes are reduced, thereby greatly reducing the materials and other auxiliary materials. 3. The utilization rate of the liquid crystal is improved. The utilization rate of liquid crystal in the ODF process is up to over 95%, while the utilization rate in the traditional process is merely 60%. 4. The ODF process facilitates the realization of production automation, thereby saving space and manpower. 5. The equipment investment is greatly reduced. In the ODF process, the manufacturers is not required to invest in various expensive equipment for subsequent processes. Currently, the ODF technology is almost used in the manufacture of all the advance-generation, large-size TFT-LCD products. Up until now, the ODF process has not been used in the manufacturing of the electronic ink display screens.

SUMMARY

The objective of the present invention is to provide a structure of the electronic ink display screen and a manufacturing method thereof considering the problems in the manufacturing process of the electronic ink display screen in the prior art. Based on the ODF process technology, combined with the mode of the microcapsule electronic ink, the manufacturing of the electronic ink display screen is completed. The structure of the electronic ink display layer is simplified, so the electronic ink display screen has better light transmission performance and less light loss. Also, the manufacturing process is simplified, the production process is shortened, the automation is realized, and the production efficiency and the yield are increased.

In order to achieve the above-mentioned technical objective, the technical solution of the present invention is as follows. An electronic ink display screen includes a pixel electrode, an electronic ink microcapsule array and an upper transparent electrode, wherein the electronic ink microcapsule array is provided between the pixel electrode and the upper transparent electrode; a spacer frame is coated on the pixel electrode, and the spacer frame includes a first spacer frame, a second spacer frame, and a support frame; the second spacer frame and the support frame are provided on a side of the first spacer frame; the electronic ink microcapsule array is provided inside the first spacer frame; a conductive silver paste is provided inside the second spacer frame; the upper transparent electrode is covered on the spacer frame; the conductive silver paste electrically contacts the pixel electrode and the upper transparent electrode; the upper transparent electrode electrically contacts the electronic ink microcapsule array; a transparent electrode substrate is provided on the upper transparent electrode; and peripheries of the spacer frame and the upper transparent electrode are sealed and fixed by a waterproof adhesive.

Further, the electronic ink display screen further includes an integrated circuit (IC) module, wherein the IC module is provided on a side of the spacer frame, and is adhered to the pixel electrode through an Anisotropic Conductive Film (ACF) strip; and peripheries of the IC module and the ACF strip are sealed and fixed on the pixel electrode by a Room Temperature Vulcanized (RTV) Silicone.

Further, two second spacer frames are provided; four support frames are provided; the two second spacer frames are respectively located at two ends of the four support frames arranged in line; each support frame has a hollow cavity structure for supporting the upper transparent electrode.

Further, the electronic ink microcapsule array is composed of a plurality of uniformly distributed microcapsules having different sizes; the microcapsules have a diameter of 30-300 μm and contain at least two types of electrophoretic particles having different photoelectric performances; and the different electrophoretic particles are configured to display various colors in the electronic ink display screen.

Further, the spacer frame has a frame width of 10-300 μm and a frame height of 5-150 μm; the spacer frame is made of resin; the resin includes epoxy resin, acrylic resin, or polyurethane resin; the resin further includes a support material; and the support material includes a resin microsphere or a glass microsphere.

Further, the pixel electrode includes a segment code and a dot matrix; the pixel electrode is made of glass or plastic; and the plastic includes Polyimide (PI), Polyethylene Naphthalate (PEN) or PET.

Further, a conductive layer is coated on a contact surface of the upper transparent electrode and the electronic ink microcapsule array; the conductive layer is ITO, a silver nanowire, graphene or a carbon nanotube; the transparent electrode substrate is glass, plastic, glass with a protection layer, or plastic with the protection layer; and the plastic includes PI, PEN, PET.

Further, in order to achieve the above-mentioned technical objective, the present invention provides a method for manufacturing an electronic ink display screen, which includes the following steps:

step 1: selecting a Thin Film Transistor (TFT) glass substrate as a pixel electrode; coating a pattern of a spacer frame on the pixel electrode by an ODF process and a sealant material, and curing the sealant material, wherein the pattern of the spacer frame includes a first spacer frame, a second spacer frame, and a support frame;

step 2: dropping and coating a microcapsule electronic ink inside the first spacer frame by using an adhesive dispenser, and then heating and drying to form an electronic ink microcapsule array;

step 3: dropping and coating a conductive silver paste inside the second spacer frame by using the adhesive dispenser;

step 4: attaching an upper transparent electrode on the entire spacer frame by pressing;

step 5: cutting off a part of the upper transparent electrode by laser to expose a predetermined position for an IC module to be bound on the pixel electrode;

step 6: covering a transparent electrode substrate on the upper transparent electrode;

step 7: dropping and coating a waterproof adhesive on a periphery of the spacer frame for edge sealing by using the adhesive dispenser, and then emitting ultraviolet light to cure the waterproof adhesive;

step 8: configuring the IC module on the edges of the pixel electrode by a COG process;

step 9: sealing and fixing the IC module inside an RTV Silicone by an RTV Silicone process to complete the manufacture of the electronic ink display screen.

Further, in the step 2, before forming the electronic ink microcapsule array, a prime adhesive is dropped and coated on a surface of the pixel electrode inside the first spacer frame by using the adhesive dispenser, and then the prime adhesive is heated and dried to form a prime adhesive film for protecting the pixel electrode.

Further, a protection layer in the transparent electrode substrate is deposited on a surface of the transparent electrode substrate by an evaporation deposition method.

Compared with the traditional electronic ink display screen, the present invention has the following advantages.

1) In the present invention, the ODF process is used to produce an electronic ink display screen, which takes the full advantages of the ODF technique. By combining with the microcapsule electrophoretic display technology, the present invention overcomes a series of problems in the original production processes of the electronic ink display screen.

2) By using the ODF production process, there is no complicated processes in production of the electronic paper film sheet as the prior art had, and the electronic paper production and the electronic paper display screen are directly processed in combination. Meanwhile, the back end process of the electronic paper display screen is greatly simplified, which has many advantages such as a shortened process, an easy automation, a high production efficiency, and an increased yield.

3) The electronic ink display screen produced by using the ODF process has unique advantages in the aspect of producing large-size electronic ink display screens, which can easily overcome the 42-inch size limitation of electronic ink display screens, and realize the production of large-size screens with a size more than 100 inches.

4) The structure of the electronic ink display layer is simplified. The light transmission performance is better, and the light loss is reduced, so that the electronic ink shows a higher contrast and a better white contrast, which greatly enriches the driving solutions of the electronic ink display and the display effects. Compared with the popular techniques at present, better color saturation and color resolution, especially in true color, can be achieved.

5) The waterproofing and sealing performances of electronic ink display screen are improved, so it has a better environmental applicability, and can be used in a wider range of temperature and humidity.

6) The electronic ink layer contains a fluorescent material, which can enhance the display effect of the display screen.

7) A low-voltage (3V) drive can be realized.

8) The problems that the large capsules (greater than 80 microns) are difficult to be coated, and the space inside the coated capsule are compressed can be overcome, thereby realizing the multi-particle and the color display.

9) The investment of equipment in manufacturing process is reduced, the back end equipment is greatly reduced due to the simplified processes, and the space and manpower are saved in the meantime.

10) The utilization rate of electronic ink materials is increased from less than 40% in the traditional process to more than 95% in the ODF process.

11) The waste of other consumables including ITO, protection films and other materials are reduced.

12) The manufacturing time of the electronic ink display screen is reduced.

Figure 1:
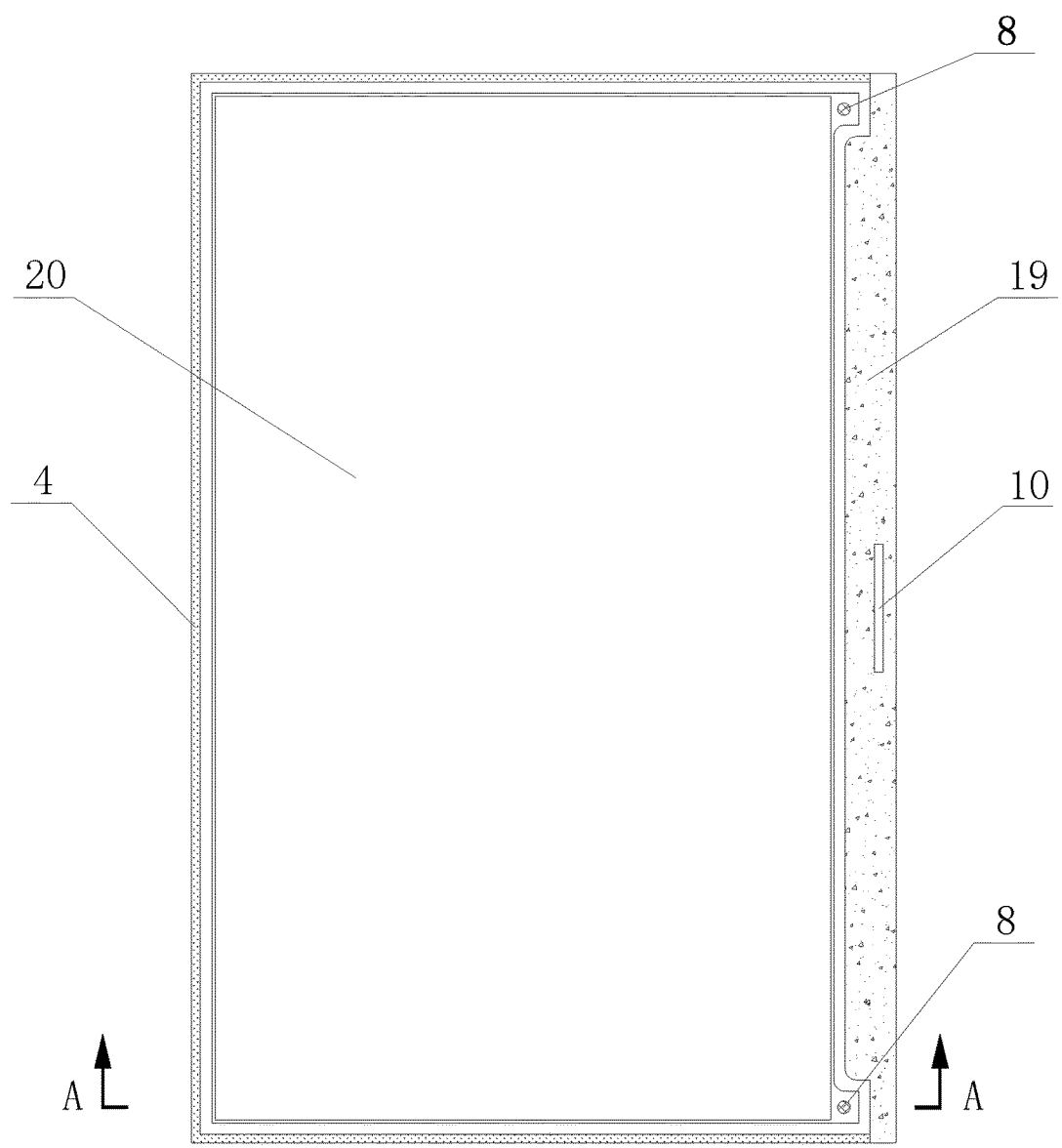
FIG. 1 is a top perspective view showing the structure of an electronic ink display screen in the prior art.
Figure 2:
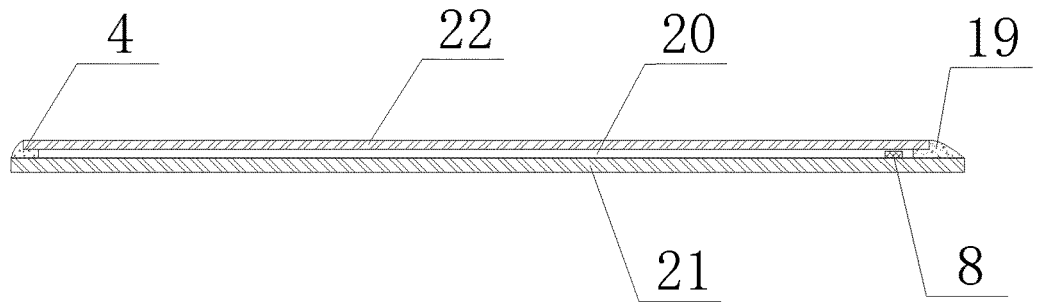
FIG. 2 is a structural schematic diagram showing a sectional view taken along the line A-A in FIG. 1.

The description of reference designators: 1: white particle; 2: black particle; 3: spacer frame; 4: waterproof adhesive; 5: pixel electrode; 6: prime adhesive; 7: electronic ink microcapsule array; 8: conductive silver paste; 9: RTV Silicone; 10: IC module; 11: ACF strip; 12: upper transparent electrode; 13: other particles; 14: second spacer frame; 15: first spacer frame; 16: support frame; 17: transparent electrode substrate; 18: protection layer; 19: silica gel; 20: electronic paper film sheet; 21: glass substrate; 22: PS.

DETAILED DESCRIPTION OF THE EMBODIMENTS

The present invention will be further described hereinafter with reference to the specific drawings and embodiments.

The present invention is not limited to the following embodiments. The referred drawings in the following description are intended to illustrate the contents of the present invention, namely, the present invention is not limited to the structure of the electronic ink display screen exemplified in the drawings.

Figure 3:
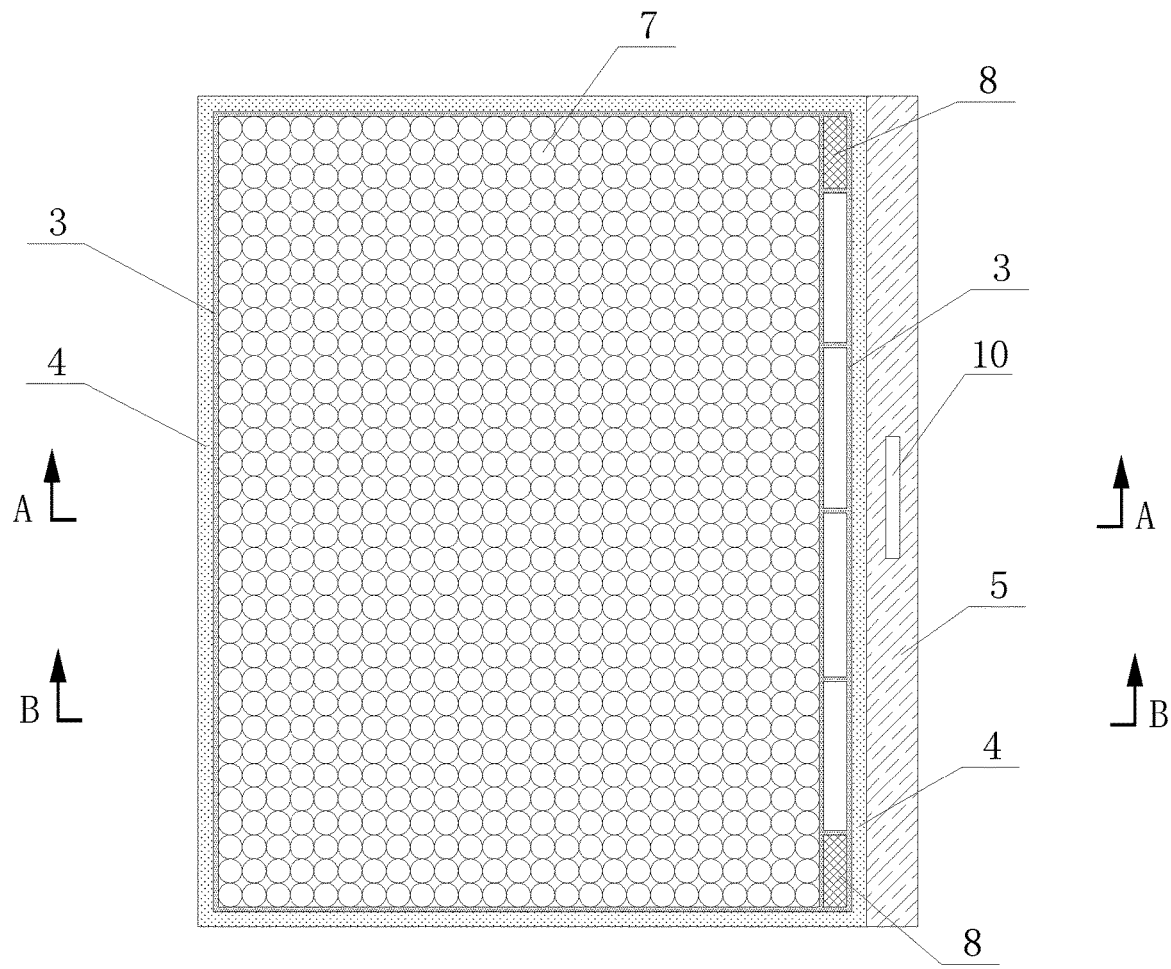
FIG. 3 is a top perspective view showing the structure of the present invention.
Figure 4:
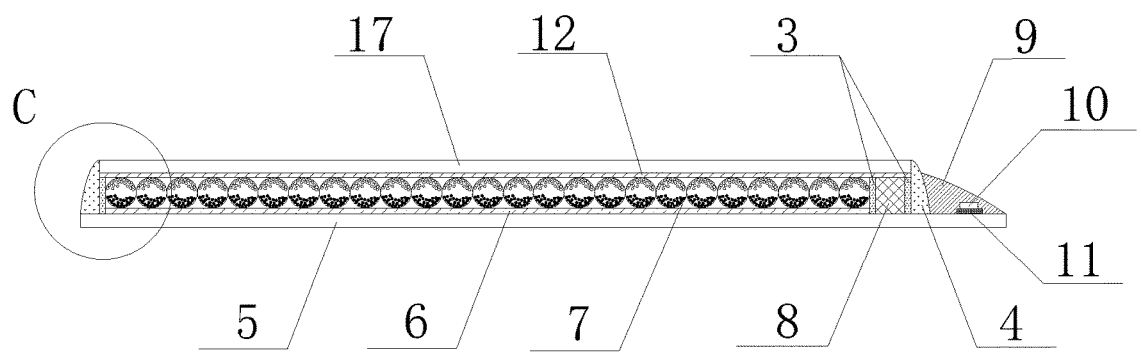
FIG. 4 is a structural schematic diagram showing a sectional structural view taken along the line A-A in FIG. 3 according to Embodiment 1 of the present invention.
Figure 5:
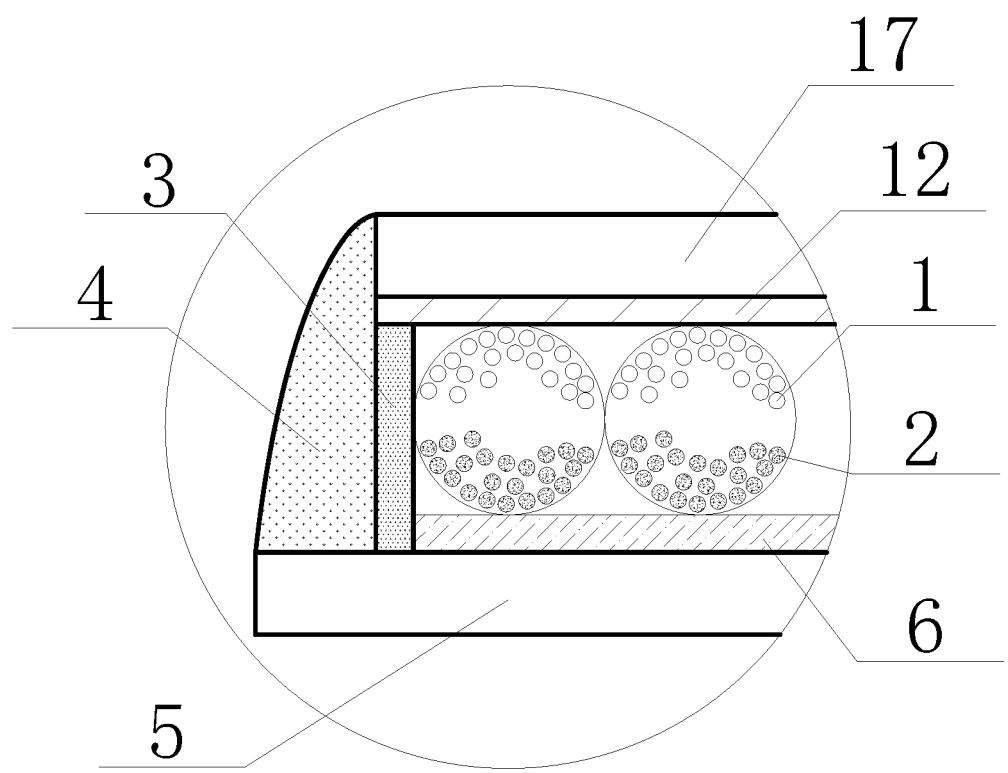
FIG. 5 is a partially enlarged view of FIG. 4 according to Embodiment 1 of the present invention.
Figure 6:
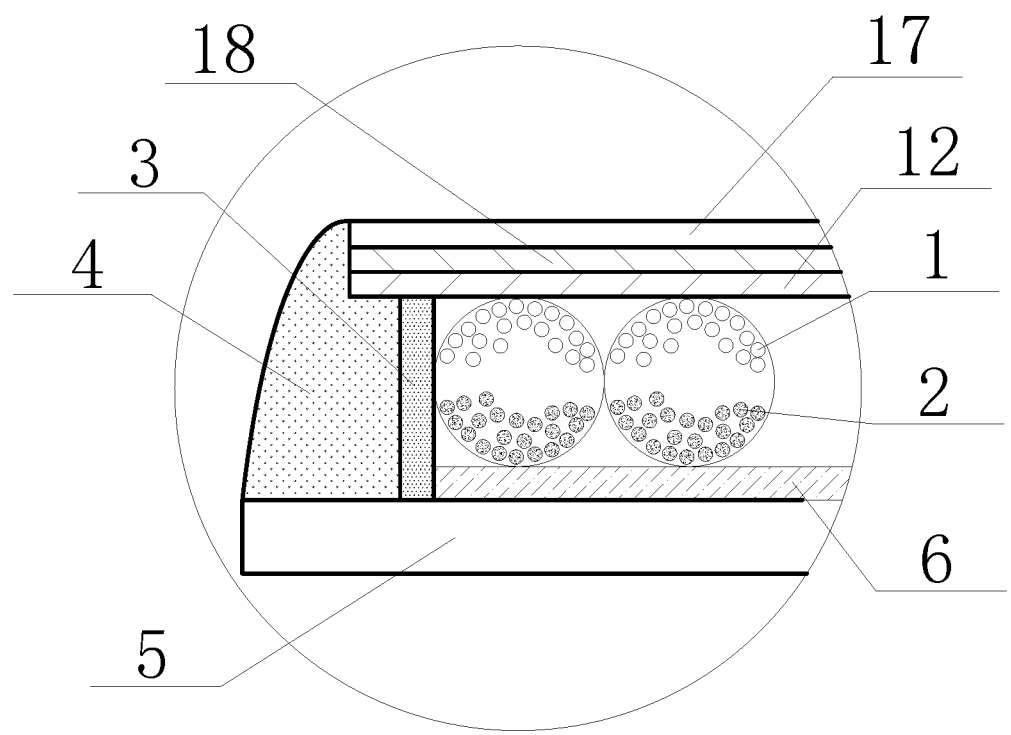
FIG. 6 is a partially enlarged view of FIG. 4 with a protection layer according to Embodiment 1 of the present invention.

As shown in FIG. 3 to FIG. 5, in Embodiment 1, a double-particle electronic ink display screen is taken as an example. An electronic ink display screen includes a pixel electrode 5, an electronic ink microcapsule array 7 and an upper transparent electrode. The electronic ink microcapsule array 7 is provided between the pixel electrode 5 and the upper transparent electrode. The pixel electrode 5 includes a segment code and a dot matrix. The pixel electrode is made of glass or plastic. The plastic includes PI, PEN or PET. A spacer frame 3 is coated on the pixel electrode 5. The electronic ink microcapsule array 7 is provided inside a first spacer frame 15. A prime adhesive 6 is provided between the electronic ink microcapsule array 7 and the pixel electrode 5 to protect the pixel electrode 5. The electronic ink microcapsule array 7 is composed of a plurality of uniformly distributed microcapsules having different sizes. The microcapsules have a diameter of 30-300 μm, preferably 50-150 μm, and optimally 80-120 μm. The microcapsules include a plurality of white particles 1 and a plurality of black particles 2. The white particles 1 and the black particles 2 are subjected to different electric fields, so that the electronic ink display screen can display black and white. Meanwhile, the microcapsules may further include a fluorescent material. The fluorescent material includes an inorganic fluorescent material and an organic fluorescent material. The inorganic fluorescent material includes a rare earth fluorescent material and a metal sulfide etc. The organic fluorescent material includes a micro-molecular fluorescent material and a macromolecular fluorescent material etc. Conductive silver paste 8 is provided inside the second spacer frame 14. An upper transparent electrode 12 is covered on the spacer frame 3. The conductive silver paste 8 electrically contacts the pixel electrode 5 and the upper transparent electrode 12, respectively. The upper transparent electrode 12 electrically contacts the electronic ink microcapsule array 7. A transparent electrode substrate 17 is covered on the upper transparent electrode 12. A conductive layer is coated on the upper transparent electrode 12. The conductive layer is ITO, silver nanowire, graphene or carbon nanotube. The transparent electrode substrate 17 is glass, plastic, glass with a protection layer 18, or plastic with the protection layer 18. FIG. 6 is a structural schematic diagram showing a sectional view of the transparent electrode substrate 17 with a protection layer 18. The plastic includes PI, PEN or PET. Peripheries of the spacer frame 3 and the upper transparent electrode are sealed and fixed by a waterproof adhesive 4. The electronic ink display screen further includes an IC module 10. The IC module 10 is located on a side of the spacer frame 3 and is adhered to the pixel electrode 5 through an ACF strip 11. Peripheries of the IC module 10 and the ACF strip 11 are fixed and sealed on the pixel electrode 5 by an RTV Silicone 9.

Figure 7:
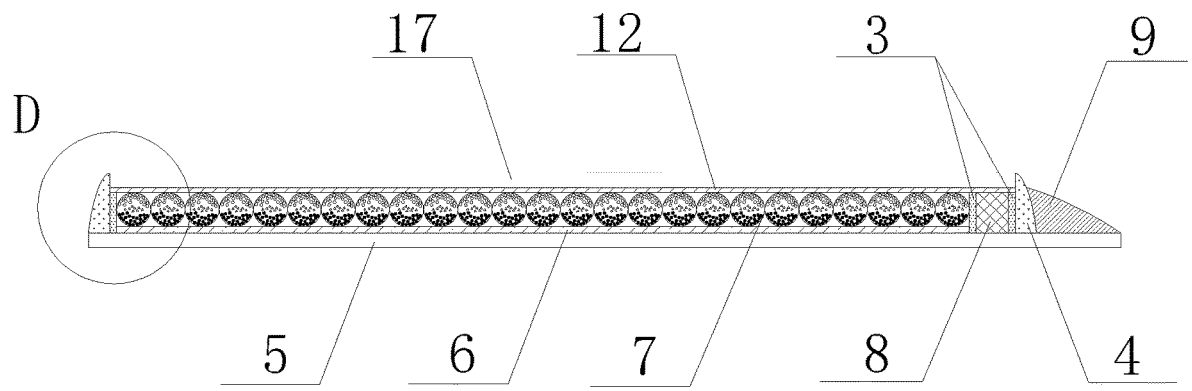
FIG. 7 is a structural schematic diagram showing a sectional structural view taken along the line B-B in FIG. 3 according to Embodiment 2 of the present invention.
Figure 8:
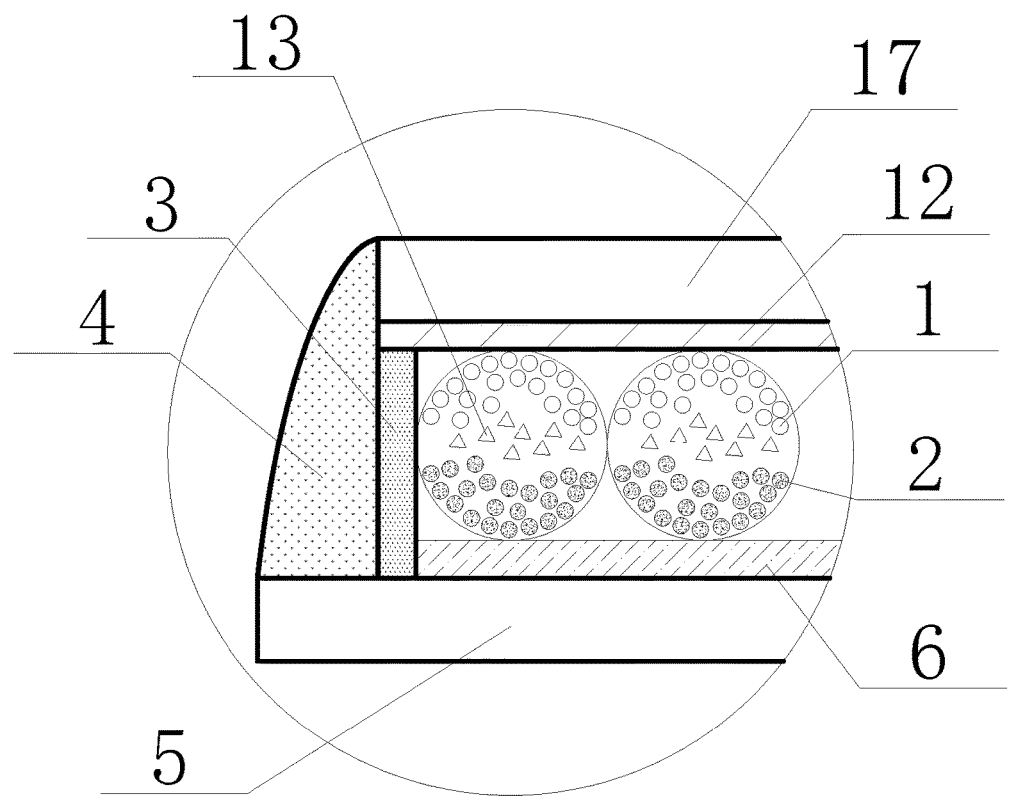
FIG. 8 is a partially enlarged view of FIG. 7 according to Embodiment 2 of the present invention.

As shown in FIGS. 3, 7 and 8, in Embodiment 2, a multi-particle electronic ink display screen is taken as an example. The structure of the electronic ink display screen is the same as Embodiment 1, except that the microcapsules forming the electronic ink microcapsule array 7 contain a plurality of white particles 1, a plurality of black particles 2, and a plurality of other particles 13. One or more types of other particles 13 are provided. Since the white particles 1, the black particles 2, and the other particles 13 are subjected to different electric fields, the multicolor electrophoretic particles with different photoelectric performances can be driven by the IC module 10 to make the electronic ink display screen display patterns with various colors.

Figure 9:
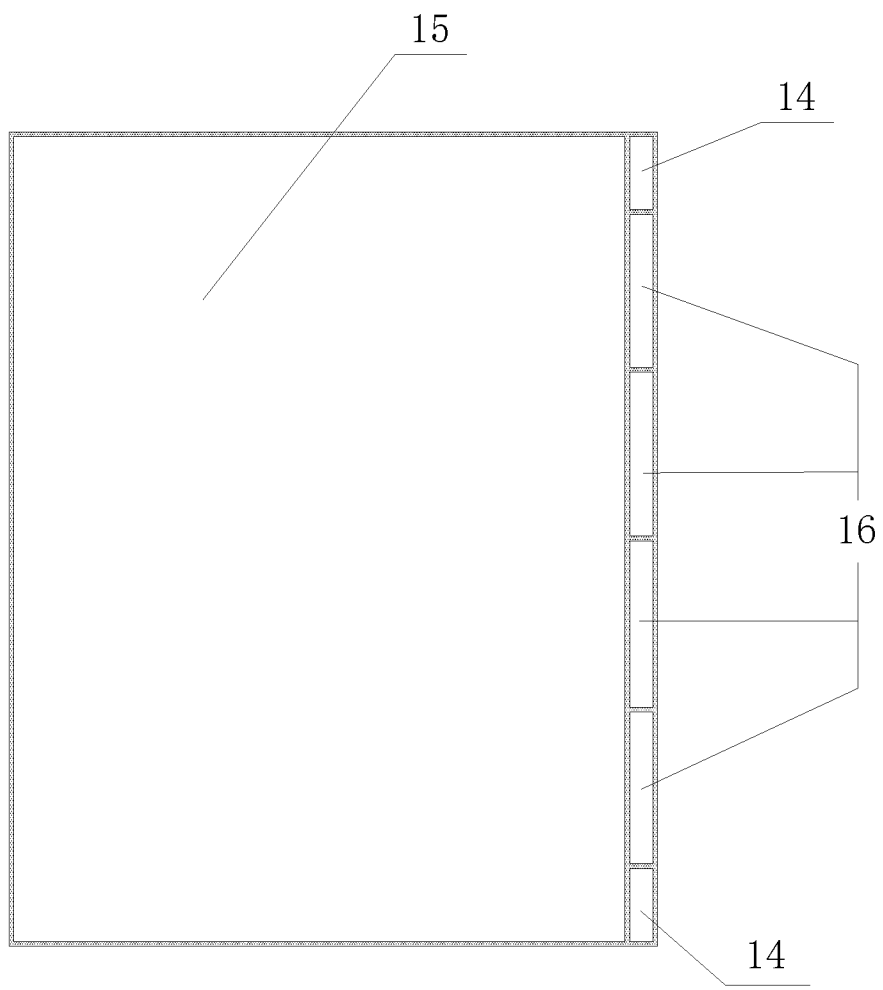
FIG. 9 is a top view showing the structure of a spacer frame formed by using the ODF process of the present invention.

FIG. 9 is a top view showing the structure of a spacer frame 3 according to the embodiments of the present invention. The spacer frame 3 has a frame width of 10-300 μm, a preferable thickness of 50-200 μm, a frame height of 5-150 μm, and a preferable height of 15-60 μm. The spacer frame 3 is made of resin. The resin includes epoxy resin, acrylic resin, or polyurethane resin. The resin contains a support material. The support material includes resin microsphere or glass microsphere. The spacer frame 3 includes a first spacer frame 15, a second spacer frame 14, and a support frame 16. The second spacer frame 14 and the support frame 16 are located on a side of the frame of the first spacer frame 15.

Two second spacer frames 14 are provided. Four support frames 16 are provided. The two second spacer frames 14 are respectively located on two ends of the four lined up support frames 16. The support frames 16 have a hollow cavity structure for supporting the upper transparent electrode, and play a role of reducing the amount of waterproof adhesive 4 and improving the waterproof effect.

In the embodiments of the present invention, the frame width and thickness of the spacer frame 3 may be determined according to actual requirements. The size and shape of the first spacer frame 15, the second spacer frame 14, and the support frame 16 may also be determined according to the size of the display screen produced in practice. The number and location of the second spacer frame 14 and the support frame 16 are not fixed, and can be flexibly determined.

In the embodiments of the present invention, the conductive silver paste 8 may be replaced by conductive beads. The method for curing the sealant material that forms the spacer frame 3 includes photocuring, heat curing or moisture curing. Preferably, the method is the photocuring method. The prime adhesive 6 includes polyacrylic acid, polymethacrylic resin, polyurethane, epoxy resin, and silicone resin etc.

In the embodiments of the present invention, a method for manufacturing an electronic ink display screen, includes the following steps:

step 1: selecting a TFT glass substrate as a pixel electrode; coating a pattern of a spacer frame 3 on the pixel electrode 5 by an ODF process and a sealant material, and curing the sealant material, wherein the pattern of the spacer frame 3 includes a first spacer frame 15, a second spacer frame 14, and a support frame 16;

step 2: dropping and coating a microcapsule electronic ink inside the first spacer frame 15 by using an adhesive dispenser, and then heating and drying to form an electronic ink microcapsule array 7;

before forming the electronic ink microcapsule array 7, a prime adhesive 6 is dropped and coated on a surface of the pixel electrode 5 inside the first spacer frame 15 by using the adhesive dispenser, and then the prime adhesive 6 is heated and dried to form a prime adhesive film for protecting the pixel electrode 5; glass microspheres or resin microspheres are sprayed on a capsule filling area inside the first spacer frame 15 beforehand;

step 3. dropping and coating conductive silver paste 8 inside the second spacer frame 14 by using the adhesive dispenser;

step 4: attaching an upper transparent electrode 12 on the entire spacer frame 3 by pressing;

step 5: trimming off a part of the upper transparent electrode 12 by laser to expose a predetermined position for binding an IC module 10 on the pixel electrode 5;

step 6: covering a transparent electrode substrate 17 on the upper transparent electrode 12;

a protection layer 18 in the transparent electrode substrate 17 is deposited onto a surface of the transparent electrode substrate 17 by an evaporation deposition method;

step 7: dropping and coating a waterproof adhesive 4 on a periphery of the spacer frame 3 for edge sealing by using the adhesive dispenser, and then emitting ultraviolet light to cure the waterproof adhesive;

step 8: configuring the IC module 10 on the edges of the pixel electrode 5 by a COG process;

step 9: sealing and fixing the IC module 10 inside an RTV Silicone 9 by an RTV Silicone process to complete the manufacture of the electronic ink display screen.

In the present invention, the ODF process is used to produce an electronic ink display screen, which takes the full advantages of the ODF technology. By combining with the microcapsule electrophoretic display technology, a series of problems in the production process of the electronic ink display screen in the prior art are overcome. By using the ODF production process, there is no complicated process in the production of traditional electronic paper film sheet, and the electronic paper production and the electronic paper display screen are directly processed in combination. Meanwhile, the back end process of the electronic paper display screen is greatly simplified, which has many advantages such as shortened process, easy automation, high production efficiency, and increased yield etc. Besides, in the present invention, the electronic ink display screen can be used in the temperature range from −25° C. to 60° C., and a large-scale electronic ink display screen having a size more than 100 inches can be produced.

The present invention and the embodiments thereof are described above. The description has no limitation to the present invention. In the drawings merely show one of the embodiments of the present invention and the actual structure is not limited thereto. In conclusion, the construction methods and embodiments similar to the technical solution that are designed by those having ordinary skill in the art inspired by the present invention without departing from the ideas of the present invention and creative efforts should be considered as falling within the scope of the present invention.

What is claimed is:

1. An electronic ink display screen, comprising a pixel electrode, an electronic ink microcapsule array and an upper transparent electrode, the electronic ink microcapsule array is provided between the pixel electrode and the upper transparent electrode; wherein a spacer frame is coated on the pixel electrode, and the spacer frame comprises a first spacer frame and a second spacer frame; the second spacer frame is provided on a side of the first spacer frame; the electronic ink microcapsule array is provided inside the first spacer frame; a conductive silver paste is provided inside the second spacer frame; the upper transparent electrode is covered on the spacer frame; the conductive silver paste electrically contacts the pixel electrode and the upper transparent electrode, respectively; the upper transparent electrode electrically contacts the electronic ink microcapsule array; a transparent electrode substrate is provided on the upper transparent electrode; and peripheries of the spacer frame and the upper transparent electrode are sealed and fixed by a waterproof adhesive.

2. The electronic ink display screen according to claim 1, further comprising an IC module, wherein the IC module is provided on a side of the spacer frame and is adhered to the pixel electrode through an ACF strip; and peripheries of the IC module and the ACF strip are sealed and fixed on the pixel electrode by an RTV Silicone.

3. The electronic ink display screen according to claim 1, wherein the spacer frame further comprises a support frame; the support frame is located at an edge of the spacer frame, and the support frame has a hollow cavity structure for supporting the upper transparent electrode.

4. The electronic ink display screen according to claim 1, wherein the electronic ink microcapsule array comprises a plurality of uniformly distributed microcapsules having different sizes; the plurality of microcapsules have a diameter of 30-300 and contain at least two types of electrophoretic particles having different photoelectric performances; the two types of electrophoretic particles are configured to display various colors in the electronic ink display screen.

5. The electronic ink display screen according to claim 1, wherein the spacer frame has a frame width of 10-300 μm and a frame height of 5-150 μm; the spacer frame is made of resin; the resin comprises epoxy resin, acrylic resin, or polyurethane resin; the resin further comprises a support material; the support material comprises resin microsphere or glass microsphere.

6. The electronic ink display screen according to claim 1, wherein the pixel electrode comprises a segment code and a dot matrix; the pixel electrode is made of glass or plastic; and the plastic comprises PI, PEN, or PET.

7. The electronic ink display screen according to claim 1, wherein a conductive layer is coated on a contact surface of the upper transparent electrode and the electronic ink microcapsule array; the conductive layer is ITO, silver nanowire, graphene, or carbon nanotube; the transparent electrode substrate is glass, plastic, glass with a protection layer, or plastic with the protection layer; and the plastic comprises PI, PEN, or PET.

8. A method for manufacturing an electronic ink display screen, comprising the following steps:
   step 1: selecting a Thin Film Transistor (TFT) glass substrate as a pixel electrode; coating a pattern of a spacer frame on the pixel electrode using a sealant material by an ODF process, and curing the sealant material, wherein the pattern of the spacer frame comprises a first spacer frame, a second spacer frame, and a support frame;
   step 2: dropping and coating a microcapsule electronic ink inside the first spacer frame by using an adhesive dispenser, and then heating and drying to form an electronic ink microcapsule array;
   step 3: dropping and coating a conductive silver paste inside the second spacer frame by using the adhesive dispenser;
   step 4: attaching an upper transparent electrode on the spacer frame by pressing;
   step 5: trimming off a part of the upper transparent electrode by laser to expose a predetermined position for binding an IC module on the pixel electrode;
   step 6: covering a transparent electrode substrate on the upper transparent electrode;
   step 7: dropping and coating a waterproof adhesive on a periphery of the spacer frame for edge sealing by using the adhesive dispenser, and then emitting ultraviolet light to cure the waterproof adhesive;
   step 8: configuring the IC module on an edge of the pixel electrode by a COG process;
   step 9: sealing and fixing the IC module inside an RTV Silicone by an RTV Silicone process to complete the manufacture of the electronic ink display screen.

9. The method for manufacturing the electronic ink display screen according to claim 8, wherein in the step 2, before forming the electronic ink microcapsule array, a prime adhesive is dropped and coated on a surface of the pixel electrode inside the first spacer frame by using the adhesive dispenser, and then the prime adhesive is heated and dried to form a prime adhesive film for protecting the pixel electrode.

10. The method for manufacturing the electronic ink display screen according to claim 8, wherein a protection layer in the transparent electrode substrate is deposited onto a surface of the transparent electrode substrate by an evaporation deposition method.

* * * * *